March 15, 1955     R. W. BUDD     2,704,302
MOUNTING AND RETAINING MEANS FOR ELECTRIC WIRING
Filed July 20, 1950
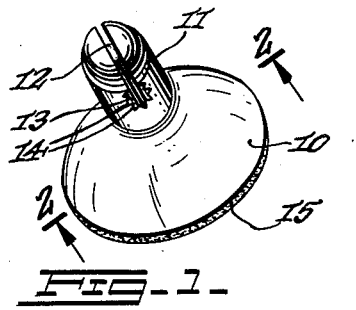
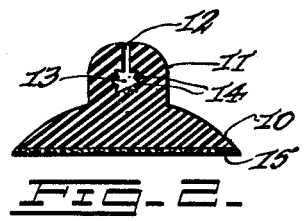
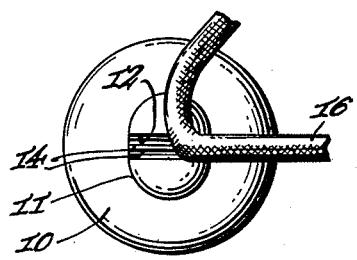
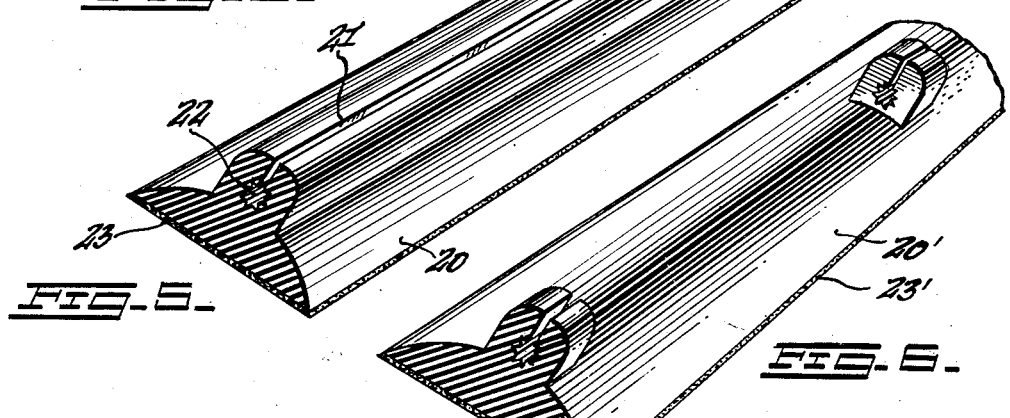
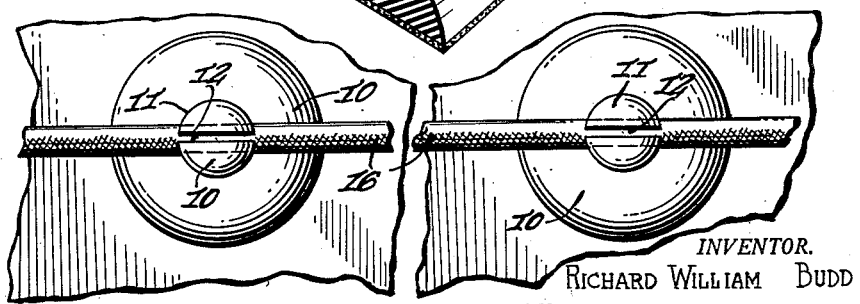
INVENTOR.
RICHARD WILLIAM BUDD
BY
ATTORNEY.

United States Patent Office 2,704,302
Patented Mar. 15, 1955

2,704,302

MOUNTING AND RETAINING MEANS FOR ELECTRIC WIRING

Richard William Budd, New York, N. Y.

Application July 20, 1950, Serial No. 174,830

2 Claims. (Cl. 174—175)

This invention relates to new and improved mounting or retaining means for electrical wiring.

It is the general practice either to allow the electrical wiring for appliances such as refrigerators, clocks, lamps and the like to extend loosely from the appliance to the most convenient wall outlet, or to staple the wiring to the wall as it extends along the latter. The former of these practices is found undesirable in that the loose wiring constitutes a safety hazard as well as an eyesore. The latter practice has been found unsatisfactory in that the staples sometimes pierce the insulation of the wiring while being forced into the wall with the result that a short circuit is developed. Further, the staples cannot be removed from the wall to move the wiring without leaving objectionable holes in the wall.

One object of the invention is the provision of means for mounting or retaining electrical wiring on a wall or the like, such means being so constructed that the same is not capable of injuring the insulation of the wiring.

Another object of the invention is to construct said means so that the same can readily be secured on or removed from a wall or the like without injury to the latter.

Still another object of the invention is to construct said means so that the wiring can be engaged therewith after the same has been mounted on a wall, and that the wiring can be disengaged therefrom without removing the same from the wall.

A further object of the invention is to construct said means so that the same is capable of being manufactured economically.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the device of the invention.

Fig. 2 is a sectional view on line 2—2 of Fig. 1.

Fig. 3 is an operational plan view of the device.

Fig. 4 is a fragmentary view of a wall with a plurality of the devices of the invention mounted thereon.

Fig. 5 is a perspective view of a modified device.

Fig. 6 is a perspective view of another modified form of the invention.

The electric wire mounting and retaining means, according to the first form of the present invention shown in Figs. 1 to 4, includes a spherical plano-convex block 10 of rubber or similar material. Projecting from the convex face of block 10 is a centrally disposed cylindrical extension 11 which preferably is formed integral with said block, see Figs. 1, 2 and 3. The cylindrical extension 11 is provided with a diametral slit 12 which at its base opens into a bore 13 longitudinally aligned therewith. In the preferred form of the invention bore 13 is of circular cross-section for accommodating substantially round or oval electric wiring, but it is to be understood that for accommodating flat wiring such as the constant impedance wiring for a television antenna the said bore would be of the proper rectangular cross-section. In order that a wire engaged in the bore 13 will be securely held therein, the peripheral wall of the bore 13 has serrations 14.

The construction thus far described is such that the slit 12 can be spread open to engage a wire in bore 13, as shown in Fig. 3, and then allowed to close again, said wire then being firmly secured in said bore by the serrations 14 and the inherent tension of the material of extension 11.

In order that the device of the invention can be secured on a wall or the like without injuring the latter, the flat face of block 10 is provided with an adhesive coating 15, see Figs. 1 and 2. Thus the device can readily be cemented on the wall. Preferably the adhesive material used is one that does not become hard so that the device may be removed from the wall simply and quickly and then secured in place on another wall or in a different location on the same wall.

As shown in Fig. 4, a number of the devices of the invention are utilized for securing a wire 16 on a wall 17, each device being spaced apart from the others an appropriate distance and the wire being strung taut between them.

A modified form of the invention is illustrated in Fig. 5. In this form of the invention the block 10 and its extension 11 are replaced by a longitudinal bar 20 having the same cross-sectional outline. The upper extension of said bar is provided with a slit 21 and a bore 22 like in all respects to the slit 12 and bore 13; and the flat face of the bar has an adhesive coating 23 in all respects like the coating 15.

The modified construction is such that the bar 20 of any desired length may be secured on a wall or the like in any desired arcuate or straight path, the bore 13 therein forming a channel for the wire. Thus, the wire is secured in place throughout its length rather than at intervals as in the first described form of the invention.

Another form of the invention is illustrated in Fig. 6 wherein like reference numerals are given the same reference numerals as in Fig. 5 with a prime added. In this form of the invention there is provided a rubber bar or strip 20' having a plano-convex cross-section. As before, the plano face of bar 20' is provided with a coating 23' of adhesive material by which the same is secured on a wall or the like. The convex face of strip 20' is not provided with a longitudinal extension or ridge as heretofore, however, but is provided at regularly spaced intervals with a block 25 integral therewith. Each block 25 is provided with a longitudinal slit 26 opening into a serrated bore 27.

The construction is such that the strip 20' may be secured on a wall or the like along any desired path, and the wire engaged in the bore 27 of each block 25 as described above to secure the wire in place.

It is to be mentioned that the devices provided by the several forms of the invention may be of any desired color in order for them to complement their surroundings.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device for retaining an electrical wire comprising, an elongated insulated bar having a base plano-convex in cross-section with a projection extending from the center of the convex surface, a longitudinal bore extending through the center of said projection for the entire length thereof, a longitudinal slit extending from the upper surface of the projection through the axis of said bore, and serrations in the peripheral wall of the bore to secure the wire therein.

2. The combination of claim 1 wherein said base includes a coating of adhesive material on the outer plano surface by which the device is secured to a wall.

References Cited in the file of this patent

UNITED STATES PATENTS

| | | |
|---|---|---|
| 303,735 | Jackson | Aug. 19, 1884 |
| 346,971 | Wilson | Aug. 10, 1886 |

(Other references on following page)

UNITED STATES PATENTS

| | | |
|---|---|---|
| 551,032 | Hemphill | Dec. 10, 1895 |
| 1,759,125 | Mainello et al. | May 20, 1930 |
| 1,949,169 | McCrae | Feb. 27, 1934 |
| 2,105,833 | Feuer et al. | Jan. 18, 1938 |
| 2,234,745 | Von Barrel | Mar. 11, 1941 |
| 2,447,251 | Huette | Aug. 17, 1948 |
| 2,530,258 | Marsan | Nov. 14, 1950 |

FOREIGN PATENTS

| | | |
|---|---|---|
| 783 of 1907 | Great Britain | Jan. 11, 1908 |
| 198,739 | Great Britain | June 1, 1923 |
| 309,772 | Great Britain | Apr. 18, 1929 |
| 599,050 | Great Britain | Mar. 3, 1948 |
| 947,048 | France | Jan. 3, 1949 |